US009396038B2

(12) United States Patent
Allen et al.

(10) Patent No.: US 9,396,038 B2
(45) Date of Patent: Jul. 19, 2016

(54) RESILIENT DATA PROCESSING PIPELINE ARCHITECTURE

(71) Applicant: Sony Computer Entertainment Inc., Tokyo (JP)

(72) Inventors: Sean Ian Allen, Palo Alto, CA (US); David Sansot, Pacifica, CA (US); Michael Taylor, San Mateo, CA (US)

(73) Assignee: Sony Interactive Entertainment, Inc., Tokyo (JP)

( * ) Notice: Subject to any disclaimer, the term of this patent is extended or adjusted under 35 U.S.C. 154(b) by 348 days.

(21) Appl. No.: 13/791,601

(22) Filed: Mar. 8, 2013

(65) Prior Publication Data
US 2014/0007132 A1 Jan. 2, 2014

Related U.S. Application Data

(60) Provisional application No. 61/666,600, filed on Jun. 29, 2012.

(51) Int. Cl.
*G06F 9/46* (2006.01)
*G06F 9/50* (2006.01)
*H04L 29/08* (2006.01)
*H04L 29/06* (2006.01)

(52) U.S. Cl.
CPC .......... *G06F 9/5083* (2013.01); *H04L 67/1004* (2013.01); *H04L 69/08* (2013.01)

(58) Field of Classification Search
None
See application file for complete search history.

(56) References Cited

U.S. PATENT DOCUMENTS

| 7,779,418 | B2* | 8/2010 | Surlaker et al. ............... 719/314 |
| 2002/0129010 | A1* | 9/2002 | Fung et al. ......................... 707/3 |
| 2006/0106941 | A1* | 5/2006 | Singhal et al. ................ 709/238 |
| 2008/0072311 | A1* | 3/2008 | Mullick et al. .................. 726/15 |
| 2011/0041006 | A1* | 2/2011 | Fowler .............................. 714/10 |
| 2013/0019283 | A1* | 1/2013 | Rice et al. .......................... 726/4 |
| 2013/0124193 | A1* | 5/2013 | Holmberg ........................... 704/9 |

* cited by examiner

*Primary Examiner* — Diem Cao
(74) *Attorney, Agent, or Firm* — Joshua D. Isenberg; JDI Patent

(57) ABSTRACT

A private cloud-based processing pipeline apparatus and method for its use is disclosed. A first load balancer directs data packets to one of a plurality of collectors. The collectors authenticate the data packet. Then a second load balancer receives the data packet from the collector and to direct the data packet to one of a plurality of extract transform load (ETL) frontends, where the data packet is converted from a platform dependent form into a platform independent form and loaded into a queue. Handlers then process the converted data packets. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

50 Claims, 2 Drawing Sheets

RESILIENT DATA PROCESSING PIPELINE ARCHITECTURE

CLAIM OF PRIORITY

This application is a non-provisional of U.S. Provisional Patent Application No. 61/666,600, filed Jun. 29, 2012, the entire contents of which are incorporated herein by reference.

FIELD OF THE INVENTION

This invention relates to a method and apparatus used for data processing. Specifically, this application describes a method and apparatus for use with a private cloud-based processing pipeline architecture.

BACKGROUND OF THE INVENTION

Cloud computing allows client device platforms to access software and data stored on servers at a remote location. The client device platform gains access to the servers through a web browser or a light weight desktop or mobile application through a network connection. Typically the data transferred over a network is sent using platform independent programming languages such as Extensible Markup Language (XML) or JavaScript Object Notation (JSON). By removing heavy computing processes from the user's device, the resources devoted to processing data may be minimized. However, for efficiency reasons certain client device platforms (e.g., the PS3 from Sony Computer Entertainment) do not use XML or JSON. Instead the platform sends data in the form of binary payloads.

In resource-starved environments like video game consoles (e.g., the PlayStation3 from Sony Computer Entertainment, Inc.) there is often a fixed amount of resources available to the device. Additional processing requirements will take resources away from the game running on the device and degrade the overall gaming experience. Therefore, when retrieving data from the cloud, the communication methods cannot interfere with the resources devoted to the gaming. Devices that interact with resource-starved environments have to accept information coming from them in a non-resource intensive way. This requires the servers to accept data from the client device platform in whatever format the client device platform produces (e.g., binary) rather than a platform independent format (e.g., XML).

Thus, there is a need in the art, for a for a private cloud-based processing pipeline architecture that will allow a client device platform to send data in any format and be converted into a platform independent format.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
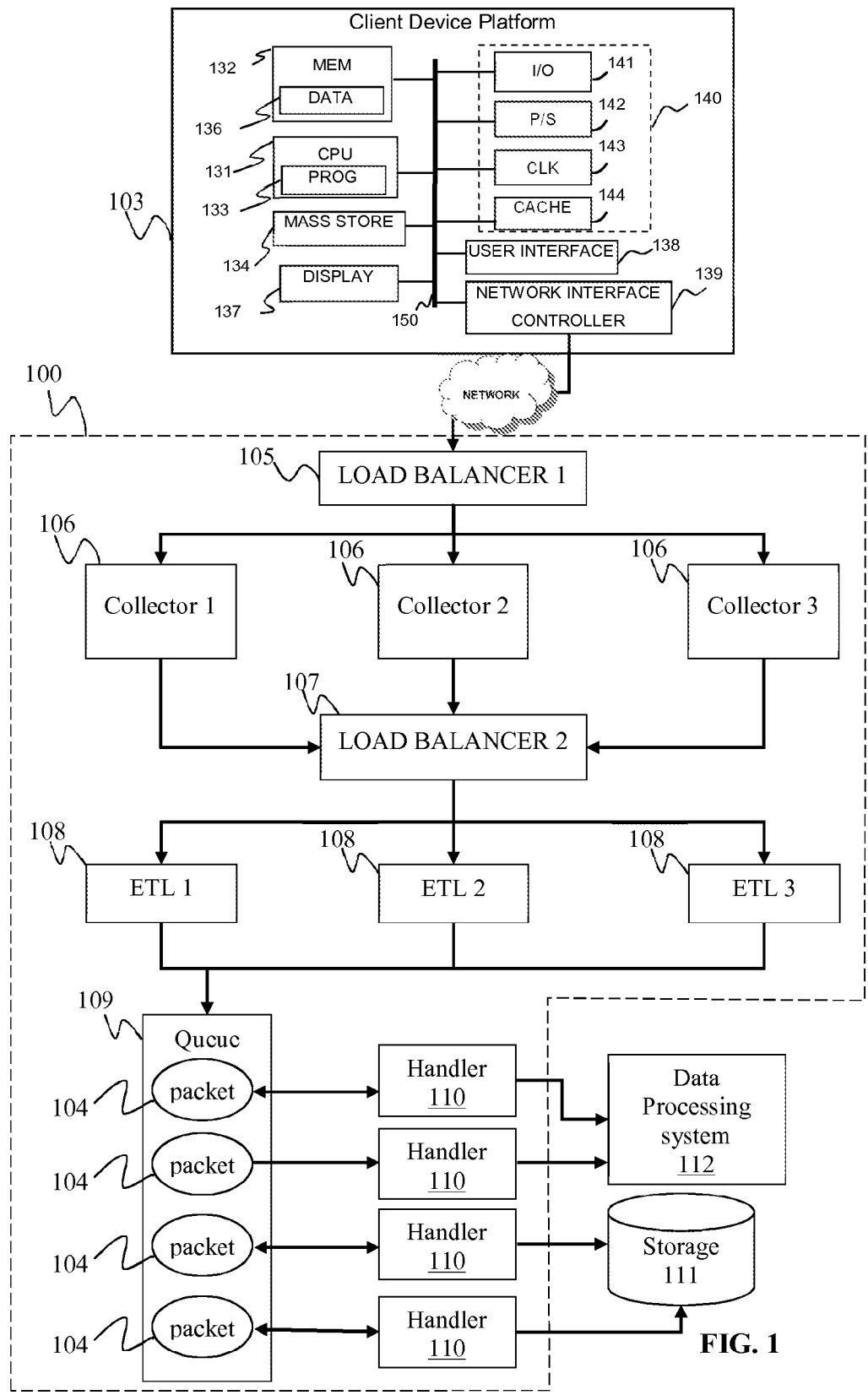
FIG. 1 is a schematic diagram of a private-cloud based pipeline architecture according to an embodiment of the present invention.

FIG. 1 schematically illustrates the architecture of a private cloud-based processing pipeline 100 according to a first embodiment of the present invention. The processing pipeline 100 may be used to process data from one or more client device platforms 103. Although only a single pipeline and client device are shown for the purposes of example, those skilled in the art will recognize that embodiments of the present invention may involve multiple similarly configured pipelines, each of which may accommodate one or more client device platforms 103. It is noted that the client device platform 103 is not a part of the processing pipeline 100 but is rather an entity that interacts with the client device 103. The pipeline 100 may be configured to interoperate with different types of client devices.

By way of example, and not by way of limitation, the client device platform 103 may include a central processor unit (CPU) 131. By way of example, a CPU 131 may include one or more multiple core processors, e.g., a dual-core, quad-core or Cell processors. The client device platform 103 may also include a memory 132 (e.g., RAM, DRAM, ROM, and the like). The CPU 131 may execute a process-control program 133, portions of which may be stored in the memory 132. The client device platform 103 may also include well-known support circuits 140, such as input/output (I/O) circuits 141, power supplies (P/S) 142, a clock (CLK) 143 and cache 144. The client device platform 103 may optionally include a mass storage device 134 such as a disk drive, CD-ROM drive, tape drive, or the like to store programs and/or data. The client device platform 103 may also optionally include a display unit 137 and user interface unit 138 to facilitate interaction between the client device platform 103 and a user. The display unit 137 may be in the form of a cathode ray tube (CRT) or flat panel screen that displays text, numerals, or graphical symbols. The user interface 138 may include a keyboard, mouse, joystick, light pen or other device. The client device platform may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The client device platform 103 may send and receive data and/or requests for files via one or more data packets 104 over the network 160.

The preceding components may exchange signals with each other via an internal system bus 150. The client device platform 103 may be a general purpose computer that becomes a special purpose computer when miming code that implements embodiments of the present invention as described herein.

The client device platform 103 and pipeline 100 may be located in physically different locations and may be separated from each other by very large distances depending on the nature of the network 160.

The client device platform 103 sends data packets 104 over a network 160 to the private cloud-based processing pipeline 100. Client device platform 103 may be one of multiple client device platforms 103 each of which can send data packets 104 to one of multiple processing pipelines 100. The solid arrows represent the flow of data packets 104 in the processing pipeline. Further, the data packets 104 are sent from the client device platform 103 in a platform dependent payload. By way of example and not by way of limitation, the platform dependent payload may be a binary payload. Allowing the client device platform 103 to generate and send payloads in a platform dependent format improves the efficient use of processing power in the client device platform 103.

The data packets 104 are first sent to a first load balancer 105. By way of example, and not by way of limitation, the first load balancer function may be implemented using a commercial based hardware product. Alternatively, the load balancer function may be implemented on a general purpose computer using suitably configured software. In general, the first load balancer 105 is configured to spread load for a processing pipeline according to packet inspection. For example, the first load balancer 105 may look at a data packet 104 and have an election amongst one or more other first load balancers 105 from two or more different processing pipelines 100 to determine which system should handle the data packet 104. Processing pipelines 100 in different regions could vote amongst themselves to figure out which one would handle that data packet 104.

Once a particular processing pipeline 100 has been selected to process the data packet 104, the first load balancer 105 is used to direct the data packet 104 to the proper collector 106. Collectors 106 are stateless machines that are capable of accepting the data packets 104 from the client device platform 103. Each collector 106 is configured to handle a unique type of data. By way of example and not by way of limitation, the collectors 106 may be configured to handle telemetry, advertising, or virtual world (e.g., Sony Computer Entertainment's PlayStation Home) data. Further, the collectors 106 may be reconfigurable, such that if there is an increased demand for a specific type of collector 106, collectors 106 in lower demand may be converted to the type in high demand. Due to their stateless nature, the number of collectors 106 present in a processing pipeline 100 is easily scalable. Additional collectors 106 may be brought online when demand is high, or collectors 106 may be deactivated when demand is low.

By way of example, and not by way of limitation, the function of the collected may be implemented by suitably configured hardware. Any server class machine (virtual or physical) may be used to implement this function. One possible implementation, among others, is for the collectors 106 to be cloud based virtual machines. The important principle behind implementation of the collectors is one of heuristic load based reconfiguration and adaptation of the system based on that.

Once a collector 106 has received a data packet 104 which it is configured to handle, the collector verifies that the data packet 104 is from a validated client. By way of example, this may be implemented through a network platform (NP) ticketing service. The NP ticketing service is cryptographic code that is embedded into the data packet 104 to ensure that the data packet is coming from an authorized client device platform 103 and is entitled to the service or data which the client device platform 103 is trying to access. After the data packet 104 has been validated, the packet 104 is passed along to a second load balancer 107.

It is noted that the first load balancer 105 and second load balancer 107 may be implemented as logically separate but not necessarily physically separate entities. The second load balancer 107 may be implemented either in hardware or software, like the first load balancer. In some implementations, both load balancers 105, 107 may be implemented on common hardware.

The second load balancer 107 collects the validated data packets 104 from each of the collectors 106 and then distributes them to extract, transform, and load (ETL) front ends 108. The purpose of the ETL front ends 108 is to extract information from the platform dependent payload in a data packet 104, transform the payload to a platform independent format, and load the resulting transformed payload into a queue 109. By way of example and not by way of limitation, an ETL front end 108 may take a payload in binary format, and transform the payload into XML format. ETL systems are traditionally huge monolithic systems that are dedicated to a particular task. However, according to the present embodiment the ETL front ends 108 can be stateless machines. As with the collectors 106, the number of ETL front ends 108 present in a processing pipeline 100 is easily scalable. Additional ETL front ends 108 may be brought online when demand is high; or ETL front ends 108 may be deactivated when demand is low.

Again any server class machine, virtual or physical may be used to implement the functions of the ETL frontends 108, queue 109, and handlers 110. By way of example, and not by way of limitation, a cloud based (meaning, API orchestrated) virtualized infrastructure may be used to implement these functions. After the data packet 104 has been transformed into a platform independent payload and loaded into the queue 109, handlers 110 may then access the data packets 104, process the data packets 104 and return outputs back to the queue 109. The handlers 110 are stateless machines that are configured to perform a specific task. By way of example and not by way of limitation, certain handlers 110 may be configured to accept data packets 104 containing e-mail messages and forward the messages to intended recipients. Alternatively, certain handlers 110 may be configured to accept a data packet 104 and copy the data packet to a storage device 111, such as a hard drive, or accept a data packet 104 and forward the information to a data processing software system 112 such as one based on Apache's Hadoop framework. The data processing software system 112 may be implemented using any suitably configured general-purpose or special-purpose computer. Such a computer may generally include one or more processor cores, a memory, and other components similar to those described above with respect to the client device platform 103 The number of handlers 110 present in a processing pipeline 100 is dynamically scalable. Additional handlers 110 may be brought online when demand is high, or handlers 110 may be deactivated when demand is low.

It is noted that the storage device 111 and data processing system 112 may be separate from the pipeline 100 and may be thought of as examples of possible recipients of outputs of the pipeline.

The order in which the data packets 104 are processed while in the queue 109 is not required to be a first in first out (FIFO) system, because the data packets 104 are declarative and have a defined task. Declarative data packets 104 have their order of processing declared in a configuration file located in the header of the data packet 104. Additionally, the data packet 104 has a defined task (i.e., the data packet 104 has a discrete input, and the output after the data packet 104 has been processed is discrete as well). The combination of declarative data packets with a defined task allows the data packets 104 to be rearranged within the queue 109 by reconfiguring the configuration file. Therefore, the body of the data packet 104 does not need to be reprogrammed.

As a result of the flexibility in the scheduling of the data packets 104, the handlers 110 can be used in a more efficient manner. In less efficient situations, the queue 109 may be used as a buffer. In this instance, handlers 110 would go to sleep if they do not see a data packet 104 that they were supposed to process. The handler 110 goes to sleep, because it cannot be used to store any data, otherwise the handler 110 would not be stateless. However, letting the handlers 110 go to sleep may result in wasted resources. In order to better utilize the handlers 110 a self-messaging system may be implemented by the handlers 110. For example, a handler 110 may need to access a storage device in order to store information found in a data packet 104, but the storage device may be currently unavailable. Rather than store the information at the handler 110, the handler can generate a message stating that this data packet 104 needs to be revisited, and put that message into the queue 109. The message may also indicate that the storage was not available at the time the data packet was last handled. Another handler 110 could then pick up the message and try to store the information from the data packet 104 at the storage device at a later time.

Figure 2:
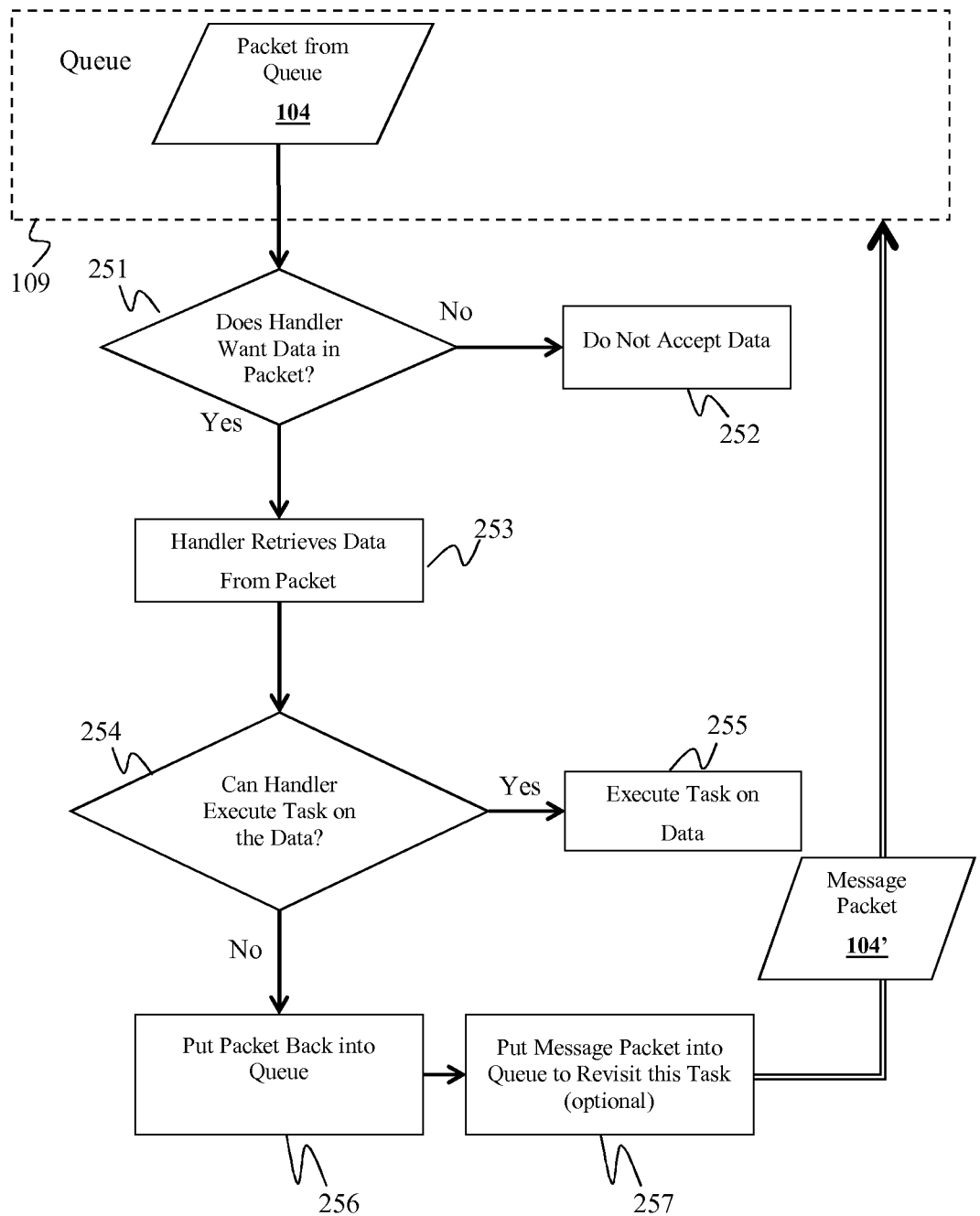
FIG. 2 is a flow diagram describing the method of how a handler processes a data packet.

FIG. 2 illustrates an example of a method 200 for efficiently using the handlers 110. First, at decision block 251 a handler 110 asks whether a given data packet 104 is of interest to the handler. If the packet 104 is not of interest to the handler 110 then the method progresses to block 252. According to block 252 the packet 104 is passed over and will be examined by additional handlers 110 until it is accepted by a handler that is interested in the data packet 104. If the data packet is of interest to the handler 110, then the method progresses to block 253. At block 253, the handler 110 retrieves the data packet 104 from the queue and begins to execute the processes it was designed to execute. After block 253, decision block 254 is reached. At 254 the handler must decide if it can execute the task on the data packet 104 at that time. If the task can be executed, then the method progresses to block 255 and handler 110 will execute the task. If the task cannot be executed at that time, then the method may progress to block 256 and the handler may return the data packet 104 to the queue 109. The handler 110 may optionally generate a message to revisit the data packet 104 at a later time, as indicated at block 257. The message may be in the form of a specially configured data packet 104' that identifies the packet 104 and may provide other information, such as, what resources that were needed to process the packet were not available when the packet was last handled. Other information may be included in the packets, such as Origination ID (for example, a game title SKU) for metrics and billing purposes, priorities, or a drop dead time (i.e., a time by which a packet should be dropped, if it has not been processed).

Returning the packet 104 to the queue 109 and putting the message 104' in the queue avoids the need to store the data packet 104 elsewhere, e.g., at the handler 110, since the data packet remains stored in the queue 109. The same handler 110, or another one of the handlers, can retrieve the message from the queue 109 and revisit the data packet 104 at a later time and process it, if the necessary resources have become available.

As may be seen from the foregoing, embodiments of the present invention allow for a highly scalable pipeline processing architecture that allows resources to be easily reconfigured. The use of stateless machines as the collectors, EFL front ends, and handlers simplifies scaling and reconfiguration.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A processing pipeline apparatus, comprising:
   computer hardware configured to implement a first load balancer configured to direct a declarative and defined data packet, to one of a plurality of collectors, wherein each collector in the plurality is configured to verify that the data packet is authorized to access a private cloud-based processing pipeline, and wherein the first load balancer and a second load balancer are connected via the plurality of collectors;
   computer hardware configured to implement the second load balancer configured to receive the data packet from a collector in the plurality and to direct the data packet to one of a plurality of frontends, wherein each of the frontends is configured to convert the data packet from a platform dependent form into a platform independent form and load the resulting converted data packet into a queue; and
   computer hardware configured to implement a plurality of handlers, wherein one or more handlers in the plurality are configured to process the data packet within the queue.

2. The apparatus of claim 1, wherein the platform dependent form is a binary format.

3. The apparatus of claim 1, wherein the platform independent form is Extensible Markup Language (XML) format.

4. The apparatus of claim 1, wherein the platform independent form is JavaScript Object Notation (JSON) format.

5. The apparatus of claim 1, wherein one or more of the collectors is a stateless machine.

6. The apparatus of claim 5, wherein at least one collector in the plurality of collectors is configured to validate data packets containing telemetry data.

7. The apparatus of claim 5, wherein at least one collector in the plurality of collectors is configured to validate data packets containing advertising data.

8. The apparatus of claim 5, wherein at least one collector in the plurality of collectors is configured to validate data packets containing virtual world data.

9. The apparatus of claim 5, wherein the number of collectors in the plurality of collectors is dynamically scalable.

10. The apparatus of claim 1, wherein the data packet is verified by the collector when the data packet originates from a validated client device platform.

11. The apparatus of claim 1, wherein a data packet is verified by the collector when the data packet contains an encrypted message indicating that access to the private cloud-based processing pipeline has been paid for.

12. The apparatus of claim 1, wherein each of the frontends in the plurality of frontends is a stateless machine.

13. The apparatus of claim 12, wherein the number of frontends in the plurality of frontends is dynamically scalable.

14. The apparatus of claim 1, wherein each of the handlers in the plurality of handlers is a stateless machine.

15. The apparatus of claim 14, wherein the number of handlers in the plurality of handlers is dynamically scalable.

16. The apparatus of 14, wherein at least one handler in the plurality of handlers is configured to process a data packet containing email information.

17. The apparatus of claim 14, wherein at least one handler in the plurality of handlers is configured to process a data packet containing user chat information.

18. The apparatus of claim 14, wherein at least one handler in the plurality of handlers is configured to store the data packet to a back-up drive.

19. The apparatus of claim 14, wherein at least one handler in the plurality of handlers is configured to return the data packet to the queue if it is not able to process the data packet.

20. The apparatus of claim 19, wherein the at least one handler in the plurality of handlers is further configured to generate and deliver a message to the queue indicating that the unprocessed data packet needs to be revisited at a later time.

21. The apparatus of claim 14, wherein the data packet is processed in a different order than an order in which the data packet was delivered to the queue.

22. The apparatus of claim 14, wherein at least one handler in the plurality of handlers is configured to deliver the data packet to a data processing software system.

23. The apparatus of claim 22, wherein the data processing software system is developed on a Hadoop framework.

24. The apparatus of claim 1, wherein the first load balancer has an election amongst a plurality of first load balancers from other pipelines to determine which pipeline of a plurality of pipelines will process the data packet.

25. The apparatus of claim 1, wherein each collector in the plurality of collectors is configured to handle a unique type of data.

26. A method for processing plurality of data packets in a processing pipeline, comprising:
   a) receiving a plurality of declarative and defined data packets;
   b) directing each data packet to one of a plurality of collectors with a first load balancer, wherein the first load balancer and a second load balancer are connected via the plurality of collectors;
   c) verifying with one or more collectors in the plurality of collectors that each data packet is authorized to access a private cloud-based processing pipeline;
   d) with the second load balancer receiving the data packets from a collector in the plurality and delivering each of the data packets to a particular frontend in a plurality of frontends, wherein each frontend in the plurality of frontends is configured to convert the data packet from a platform dependent form into a platform independent form and load the resulting converted data packet into a queue;
   e) converting the data packets from a platform dependent form to a platform independent form with the particular frontend to produce converted data packets;
   f) delivering the converted data packets to a queue; and
   g) processing each of the converted data packets with at least one handler of a plurality of handlers.

27. The method of claim 26, wherein the platform dependent form is a binary format.

28. The method of claim 26, wherein the platform independent form is Extensible Markup Language (XML) format.

29. The method of claim 26, wherein the platform independent form is JavaScript Object Notation (JSON) format.

30. The method of claim 26, wherein each of the collectors in the plurality of collectors is a stateless machine.

31. The method of claim 30, wherein at least one collector in the plurality of collectors is configured to validate one or more data packets in the plurality of declarative and defined data packets that contain telemetry data.

32. The method of claim 30, wherein at least one collector in the plurality of collectors is configured to validate one or more data packets in the plurality of declarative and defined data packets that contain advertising data.

33. The method of claim 30, wherein at least one collector in the plurality of collectors is configured to validate one or more data packets in the plurality of declarative and defined data packets that contain virtual world data.

34. The method of claim 30, wherein the number of collectors in the plurality of collectors is dynamically scalable.

35. The method of claim 26, wherein validating the data packets includes determining whether one or more data packets in the plurality of declarative and defined data packets originated from a validated client device platform.

36. The method of claim 26, wherein validating the data packets includes determining whether one or more data packets in the plurality of declarative and defined data packets contains an encrypted message indicating that access to the private cloud-based processing pipeline has been paid for.

37. The method of claim 26, wherein each of the frontends in the plurality of frontends is a stateless machine.

38. The method of claim 37, wherein the number of frontends in the plurality of frontends is dynamically scalable.

39. The method of claim 26, wherein the handlers are stateless machines.

40. The method of claim 39, wherein the number of handlers in the plurality of handlers is dynamically scalable.

41. The method of claim 39, wherein at least one handler in the plurality of handlers is configured to process one or more data packets in the plurality of declarative and defined data packets that contain email information.

42. The method of claim 39, wherein at least one handler in the plurality of handlers is configured to process one or more data packets in the plurality of declarative and defined data packets that contain user chat information.

43. The method of claim 39, wherein at least one handler is configured to store one or more data packets in the plurality of declarative and defined data packets to a back-up drive.

44. The method of claim 39, wherein at least one handler is configured to deliver the data packet to a data processing software system.

45. The method of claim 44, wherein the data processing software system is developed on a Hadoop framework.

46. The method of claim 26, wherein a processing order of the data packets in the plurality of data packets is different than the order in which the data packets were delivered to the queue.

47. The method of claim 26, further comprising:
   f) returning a given data packet in the plurality of data packets to the queue if the at least one handler is not able to process the given data packet.

48. The method of claim 26, further comprising:
   g') generating and delivering a message to the queue indicating that an unprocessed data packet in the plurality of data packets needs to be revisited at a later time.

49. The method of claim 26, wherein a) further includes holding an election amongst a plurality of other pipelines to determine which pipeline will receive a given data packet in the plurality of data packets.

50. A nontransitory computer readable medium containing program instructions, wherein execution of the program instructions by one or more processors of a computer system causes the one or more processors to carry out a method for processing plurality of data packets in a processing pipeline, the method comprising:

a) receiving a plurality of declarative and defined data packets;

b) directing each data packet to one of a plurality of collectors with a first load balancer wherein the first load balancer and a second load balancer are connected via the plurality of collectors;

c) verifying with one or more collectors in the plurality of collectors that each data packet is authorized to access a private cloud-based processing pipeline;

d) with the second load balancer receiving the data packets from a collector in the plurality and delivering each of the data packets to a particular frontend in a plurality of frontends, wherein each frontend in the plurality of frontends is configured to convert the data packet from a platform dependent form into a platform independent form and load the resulting converted data packet into a queue;

e) converting the data packets from a platform dependent form to a platform independent form with the particular frontend to produce converted data packets;

f) delivering the converted data packets to a queue; and g) processing each of the converted data packets with at least one handler of a plurality of handlers.

* * * * *